United States Patent Office 3,163,543
Patented Dec. 29, 1964

3,163,543
PROCESS OF PRODUCING GELATIN PRODUCTS
William I. Gorfinkle, Brookline, Mass., assignor to
J. O. Whitten Company, Inc.
No Drawing. Filed June 19, 1962, Ser. No. 203,437
4 Claims. (Cl. 99—134)

The present invention is directed to gelatin products and more particularly to gelatin products for therapeutic and dietary purposes.

Gelatin is increasingly prescribed as a therapeutic and/or dietary component. Much of this gelatin is taken for reducing diets and/or the improvement of hair and nails. Apparently it is often taken for these purposes by drinking about ¼ ounce suspended in fluid such as water or orange juice. The blandness of the gelatin and its grittiness are not attractive. Some is taken in the form of gelatin-filled gelatin capsules. These are expensive per unit of weight and usually require some liquid to facilitate swallowing. Attempts have been made to make confections containing relatively large percentages of gelatin, e.g., over 10%, by heating the gel to break down its viscosity. Material produced by this method has an unpleasant flavor. The pieces are usually very stiff and difficult to eat. A need exists for a high gelatin composition that has good body and taste characteristics.

It is an object of this invention to provide gelatin products having a high gelatin content. It is also an object of this invention to provide gelatin products for therapeutic and/or dietary purposes. It is a further object of this invention to provide high gelatin products having good body and taste characteristics. The invention also contemplates providing a process for preparing novel high gelatin products.

I discovered that gelatin products containing large amounts of gelatin and having superior body and taste characteristics are prepared by making up a batter of dough-like consistency by mixing sugars and moisture until a homogeneous mass is formed. Dry gelatin in the desired quantity is then worked into the dough-like mixture until the mix becomes substantially homogeneous. The gelatin product is then formed into the desired shape. Utilizing the above procedure it is possible to prepare confections of gelatin that contain almost any percentage of gelatin. The dry gelatin which is added is referred to herein as "nutritional" gelatin. It is added dry and without heat according to the aforementioned procedure so that little, if any, solution occurs. The gel or stiffness of the final product is little, if any, affected by the high amount of gelatin making it easy to chew and giving it desirable body characteristics.

Shaped gelatin products containing between 25% and 60% by weight of nutritional gelatin and preferably between 30% and 50% by weight of nutritional gelatin will be the usual product prepared in accordance with my invention. Commercially available food grade gelatin may be used in the preparation of the gelatin products. The characteristics of these gelatins vary somewhat depending upon the source and the extraction process. Differences in the gelatin characteristics will somewhat affect the final characteristics of the gelatin products, although these can be varied through proper formulation.

The sugars used in preparing the gelatin products may be the commercial products such as sucrose, glucose, levulose, lactose, fructose and maltose. Saccharide mixtures include corn syrups and some liquid may also be used. Therapeutic and/or dietary products occasionally must be sugar-free or low in sugar. Gelatin products high in nutritional gelatin can be prepared to meet these requirements by utilizing substances having characteristics equivalent to those of sugar in place of the sugar. Gelatin products having lower sugar contents may also be prepared by aerating the dough-like mass.

The gelatin products are formed as noted hereinbefore by mixing sugars and moisture until a dough-like consistency is achieved and then working the nutritional gelatin. In addition to the sugar and moisture it is preferred that the basic dough-like mixture include a relatively small proportion, e.g., 3%–7% of corn syrup and a small amount of dissolved gelatin which adds body to the final product. The preferred amount of dissolved gelatin is between ½% and 2% of the final product. The amount of moisture necessary to obtain a largely wet sugar mixture of dough-like consistency varies somewhat dependent upon the mixtures of sugars utilized as well as the other components in the basic caramel mix. For most purposes the amount of moisture will vary between about 5% and 15% of the final product. After the dough-like mix is prepared and the dry gelatin worked in, the gelatin caramel is formed to the desired shape. The gelatin containing dough can be formed into any shape and size utilizing conventional means. A wire cutter cookie machine may be used to extrude the nutritional gelatin containing mixture into strands which are cut into desired lengths and shapes. A small piece about the size of a small almond which can be chewed or swallowed whole is preferred.

The gelatin caramels may be made even more palatable and pleasing in appearance by the introduction of flavoring and coloring agents. Citric acid is often added. Edible fat, preferably in the amount of between 5% and 10%, but not limited thereto, is also often added to reduce the stickiness of the caramel in the mouth and on the lips. Milk and/or milk protein is often included. The moisture in the caramels may be added as milk or as water. Such other components as honey, vitamins and/or minerals may also be incorporated in the caramels.

For the purpose of giving those skilled in the art a better understanding of my invention, the following illustrative examples are given.

Example I

A gelatin product having a body which is useful per se and which is suitable as a base to which optional components may be added was prepared from the following components:

|   | Parts by weight |
|---|---|
| Gelatin (dissolved—usually low strength) | 1 |
| Corn syrup | 5 |
| Sugars, mixture | 80 |
| Water, adjusted to 10–15 parts by weight. | |

The above components were thoroughly mixed until a dough-like consistency was obtained. Dry gelatin in an amount corresponding to 50 parts per weight was then worked into the dough until a homogeneous mass was formed. The mass was then extruded as a strand from which small gelatin products were cut. The gelatin products produced were relatively bland and had desirable taste and body characteristics. They could be chewed and broke up rapidly in the mouth. Small products could be swallowed whole, preferably with a drink of water. They contained approximately ⅓ of nutritional gelatin.

Example II

Gelatin products were prepared following the procedure and utilizing the base composition of Example I, to which had been added prior to the incorporation of the dry gelatin, 10 parts by weight of an edible fat and 2 parts of citric acid. The gelatin products prepared broke quickly in the mouth when chewed without sticking to the lips and tongue. These products were a very satisfactory confectionery having excellent taste and body characteristics.

The gelatin products prepared are like confections and permit the intake of relatively high percentages of gelatin for therapeutic and/or dietary purposes in the form of a desirable and even delightful food. If the nutritional gelatin is not worked in dry as aforesaid, the resultant shaped body is difficult to break up in the mouth, requiring extension chewing and has what is referred to as "chewy" characteristics. Caramels prepared utilizing gums to obtain body strength also have "chewy" characteristics and are less desirable than my new confection-like gelatin products.

As many embodiments of this invention may be made without departing from the spirit and scope thereof, it is to be understood that the invention includes all such modifications and variations as come within the scope of the appended claims.

What is claimed is:

1. A process for producing gelatin products comprising preparing a mix of dough-like consistency by preparing a mixture consisting essentially of between 5% and 15% of water, between ½% and 2% of gelatin, and the remainder essentially sugar, and mixing until a homogeneous mass is formed, then working in dry nutritional gelatin in an amount between 25% and 60%, and then forming shaped gelatin products containing nutritional gelatin in substantially undissolved form; all percentages are by weight of the final product.

2. The process of claim 1 wherein the amount of dry gelatin is between 30% and 50%.

3. The process of claim 2 wherein said mixture contains between 3% and 7% corn syrup.

4. The process for producing shaped gelatin products comprising preparing a mix of dough-like consistency by mixing
   (1) about 80 parts by weight of sugar,
   (2) about 1 part of dissolved gelatin,
   (3) about 5 parts of corn syrup, and
   (4) between 10 and 15 parts of water,
until a homogeneous mass is formed, then working in about 50 parts of dry gelatin until the mix is substantially homogeneous, and then forming shaped gelatin products.

References Cited by the Examiner

UNITED STATES PATENTS 1,929,732   10/33   Ziegler _____ 99—130

OTHER REFERENCES

"Candy Production Methods and Formulas," by Richmond, The Manufacturing Confectioner, Chicago, Illinois, 1948, pp. 308 and 318.

"Knox Gelatine," copyright 1927, by Charles B. Knox Gelatine Co., Inc., Johnstown, New York, pages 2 and 5.

"Candy Production: Methods and Formulas," by Richmond, The Manufacturing Confectioner, Chicago, Illinois, 1948, pages 345, 353 and 354.

A. LOUIS MONACELL, *Primary Examiner.*

BEATRICE H. STRIZAK, *Examiner.*